US007995503B2

(12) United States Patent
Yu

(10) Patent No.: US 7,995,503 B2
(45) Date of Patent: Aug. 9, 2011

(54) METHOD FOR PROVISIONING NETWORK SERVICE PROVIDER APPLICATION IN DIGITAL INTERACTIVE BROADCASTING ENVIRONMENT

(75) Inventor: Hosang Yu, Kyunggi (KR)

(73) Assignee: Alticast Corp. (KR)

( * ) Notice: Subject to any disclaimer, the term of this patent is extended or adjusted under 35 U.S.C. 154(b) by 315 days.

(21) Appl. No.: 11/758,126

(22) Filed: Jun. 5, 2007

(65) Prior Publication Data

US 2007/0283402 A1 Dec. 6, 2007

(30) Foreign Application Priority Data

Jun. 5, 2006 (KR) .......................... 10-2006-0050303

(51) Int. Cl.
*H04L 12/16* (2006.01)
(52) U.S. Cl. ....................................................... 370/259
(58) Field of Classification Search .................. None
See application file for complete search history.

(56) References Cited

U.S. PATENT DOCUMENTS

2005/0273827 A1* 12/2005 Javed et al. ...................... 725/90
2006/0002340 A1* 1/2006 Criss et al. ...................... 370/328
2006/0041562 A1* 2/2006 Paczkowski et al. ............ 707/10
2006/0253897 A1* 11/2006 Foster et al. ...................... 726/3

FOREIGN PATENT DOCUMENTS

EP 0 989 743 A1 9/1998

\* cited by examiner

*Primary Examiner* — Chi H Pham
*Assistant Examiner* — Fan Ng
(74) *Attorney, Agent, or Firm* — Hoffman & Baron, LLP

(57) ABSTRACT

A method for provisioning a NSP application in a digital interactive broadcasting environment including: A) at a headend server transmitting the AIT table, having an application provisioning descriptor including a version information and a location information of an application in a form of ATTS; and B) at a user set-top box, b-1) checking a downloaded status of the application, and comparing the application version information in the descriptor with that stored into the set-top box, b-2) if the version in the descriptor is the same with that in the set-top box and downloading of the application has been performed normally, executing the application without downloading, and b-3) if the version in the descriptor is different from that in the set-top box or if downloading of the application has been performed abnormally, accessing and downloading the application based on the location information are performed.

9 Claims, 2 Drawing Sheets

FIG. 2

| | Name | No. of bits | Identifier |
|---|---|---|---|
| 100 | application_provisioning_descriptor( ) { | | |
| 101 | dscriptor_tag | 8 | uimsbf |
| 102 | dscriptor_length | 8 | uimsbf |
| 103 | aplication_version | 8 | uimsbf |
| 104 | AIT_url_service_length | 8 | bslbf |
| | for(i=0; i<application_url_length; i++){ | | |
| | AIT_url_byte | 8 | uimsbf |
| | } | | |
| 105 | network_id | 16 | uimsbf |
| 106 | transport_id | 16 | uimsbf |
| 107 | service_id | 16 | uimsbf |
| 108 | stored_priority | 8 | uimsbf |
| | } | | |

METHOD FOR PROVISIONING NETWORK SERVICE PROVIDER APPLICATION IN DIGITAL INTERACTIVE BROADCASTING ENVIRONMENT

TECHNICAL FIELD OF THE INVENTION

The present invention relates to a method for provisioning applications in a digital broadcasting environment. More particularly, the present invention relates to a method for provisioning network service provider applications (hereinafter, "NSP applications") which are centrally controlled by Telco and operated on a middleware such as MHP (Multimedia Home Platform), OCAP (OpenCable Application Platform) and ACAP (Advanced Common Application Platform) (totally, "interactive broadcasting standards").

BACKGROUND OF THE INVENTION

In general, the provisioning of NSP applications based on the interactive broadcasting standards, which are centrally controlled by Telco, is performed using OOB (out-of-band) transport streams. Specifically, when an application is updated, changed or corrected, the application is transported through the OOB (out-of-band) bandwidth and is downloaded using an OOB tuner (out-of-band tuner). In this type of application provisioning using the OOB transport streams, users have to stop the service he/she is currently enjoying to download the application. Further, there is no consideration about when and how to monitor the provisioning of the application. In addition, there is no guarantee that the provisioning of the application is carried out normally.

SUMMARY OF THE INVENTION

An object of the present invention is to provide a new method for provisioning applications. Specifically, the present invention aims at providing a method for provisioning NSP applications effectively and practically.

According to a preferred embodiment of the present invention, there is provided a method for provisioning a network service provider application (NSP application) in a digital interactive broadcasting environment, comprising the steps of:

A) at a broadcasting headend server, incorporating an application provisioning descriptor including at least an application version information and a location information of the NSP application to be provisioned into an application information table (AIT table) and transmitting the AIT table through a digital broadcasting network in a form of ATTS (always tuned transport stream); and B) at a user set-top box, b-1) checking the application version information specified in the application provisioning descriptor and a downloaded status of the application, and comparing the application version information with a version information of an application previously stored into the set-top box, b-2) if the application version specified in the application provisioning descriptor is the same with the version of the application previously stored in the set-top box and downloading of the application has been performed normally, executing the previously stored application without any downloading, and b-3) if the application version specified in the application provisioning descriptor is different from the version of the application previously stored in the set-top box or if downloading of the application has been performed abnormally, accessing and downloading the application based on the location information of the application to be provisioned, which is specified in the application provisioning descriptor.

According to another preferred embodiment of the present invention, there is provided a method for provisioning a network service provider application (NSP application) in a digital interactive broadcasting environment, wherein the application provisioning descriptor is present within an application descriptor loop in the AIT table.

According to further another preferred embodiment of the present invention, there is provided a method for provisioning a network service provider application (NSP application) in a digital interactive broadcasting environment, wherein the application to be provisioned is carried from any one selected from the group consisting of DSM-CC (digital storage media command and control) carousel, an application over HTTP (hypertext text transport protocol) and a combination thereof.

According to still further another preferred embodiment of the present invention, there is provided a method for provisioning a network service provider application (NSP application) in a digital interactive broadcasting environment, wherein the application to be provisioned is carried from the combination of the DSM-CC carousel and the application over HTTP.

According to more preferred embodiment of the present invention, there is provided a method for provisioning a network service provider application (NSP application) in a digital interactive broadcasting environment, wherein the application to be provisioned is carried from the DSM-CC carousel at an early stage of provisioning, and thereafter from the application over HTTP.

According to still further another preferred embodiment of the present invention, there is provided a method for provisioning a network service provider application (NSP application) in a digital interactive broadcasting environment, wherein the application provisioning descriptor further includes stored priority information of the application to be provisioned that indicates whether the application to be provisioned is to be stored into a non-volatile memory, as well as the application version information and the location information.

According to still further another preferred embodiment of the present invention, there is provided a method for provisioning a network service provider application (NSP application) in a digital interactive broadcasting environment, wherein the application provisioning descriptor further includes an application identifier that identifies which application is provisioned.

According to still further another preferred embodiment of the present invention, there is provided a method for provisioning a network service provider application (NSP application) in a digital interactive broadcasting environment, wherein the application provisioning descriptor includes information on a descriptor tag, a descriptor length, an application version, an AIT URL service length, a network identifier, a transport stream identifier, a service identifier and a stored priority.

According to still further another preferred embodiment of the present invention, there is provided a method for provisioning a network service provider application (NSP application) in a digital interactive broadcasting environment, wherein the step b-1) is carried out with activation of a provisioning monitor application for monitoring the AIT table.

According to another preferred embodiment of the present invention, there is provided a method for provisioning a network service provider application (NSP application) in a digital interactive broadcasting environment, comprising the steps of:

A) at a broadcasting headend server, incorporating an application provisioning descriptor including at least an application version information and a location information of the application to be provisioned into an application information table (AIT table) and transmitting the AIT table through a digital broadcasting network in a form of ATTS (always tuned transport stream); and B) at a user set-top box, i) starting a provisioning monitor application when the user set top box is booted, ii) tuning to the ATTS and checking the AIT table in the ATTS and the application provisioning descriptor within the AIT table, iii) checking the application version information specified in the application provisioning descriptor and a downloaded status of the application, and comparing the application version information with a version information of an application previously stored into the set-top box, iv) if the application version specified in the application provisioning descriptor is the same with the version of the application previously stored in the set-top box and downloading of the application has been performed normally, executing the previously stored application without any downloading, v) if the application version specified in the application provisioning descriptor is different from the version of the application previously stored in the set-top box or if downloading of the application has been performed abnormally, recording last version of the application in order to update the version information, setting the downloaded status as "downloading," and checking the location information of the application to be provisioned, which is specified in the application provisioning descriptor, vi) downloading the application to be provisioned based on the location information from DSM-CC carousel or HTTP, and vii) killing the previously stored application and setting the downloaded status as "downloaded" if the downloading of the application has been completed normally.

BRIEF DESCRIPTION OF THE DRAWINGS

FIG. 2 is a table that exemplifies the application provisioning descriptor to be included in the AIT table used in the method for provisioning NSP application, in accordance with the present invention.

DETAILED DESCRIPTION OF THE INVENTION

Figure 1:
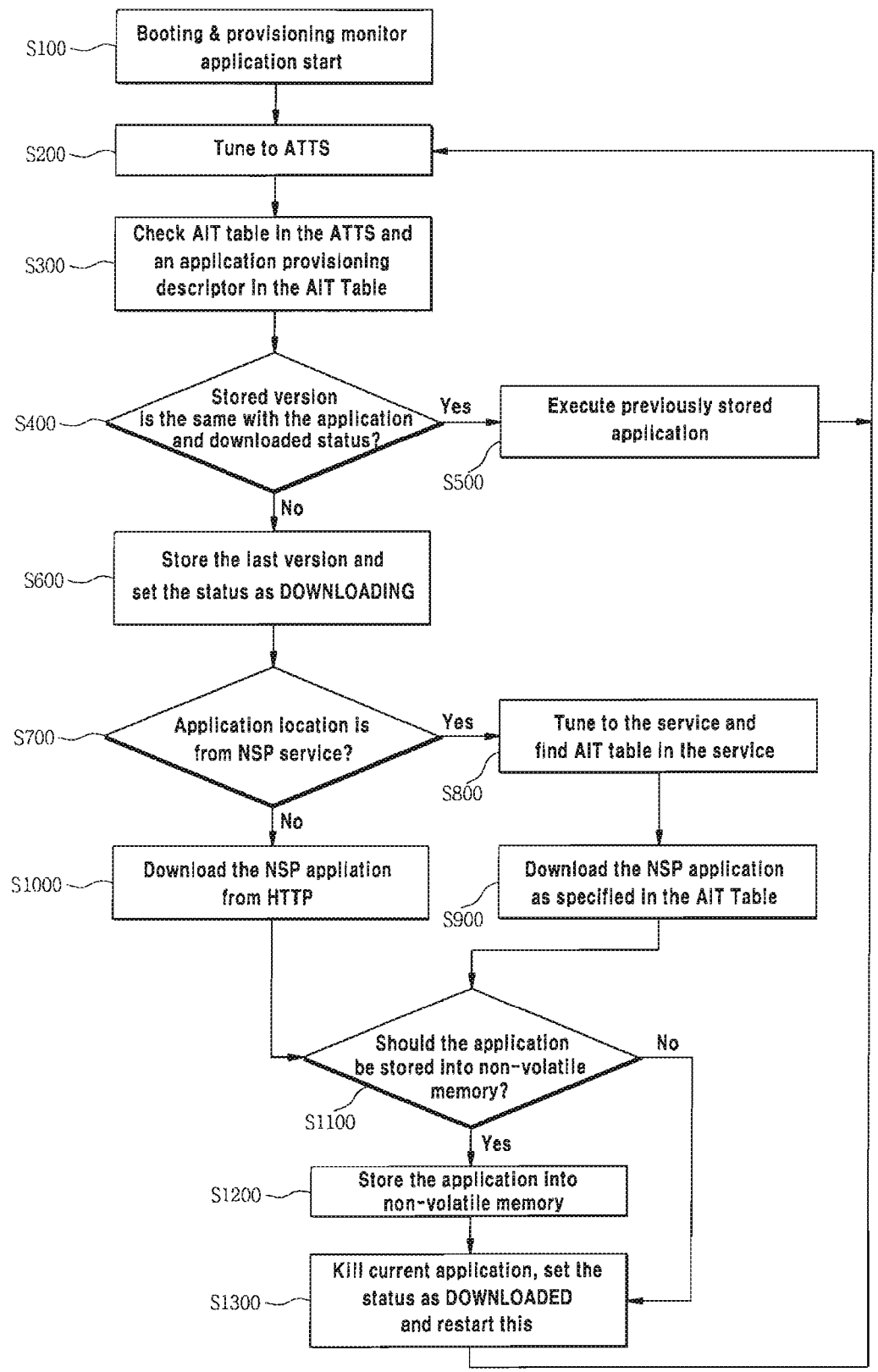
FIG. 1 is a flowchart illustrating the method for provisioning NSP applications that are preformed at a user terminal, in accordance with the present invention.

The present invention relates to a method for the efficient provisioning of applications, more particularly to a method for the efficient provisioning of NSP applications that are centrally controlled by Telco.

In digital interactive broadcasting environment, when a user selects a particular channel, the information which assists the user in navigating through the program content is provided along with audio, video and data belonging to the selected channel. This information can be separated into program-specific information (PSI) and service information (SI). The PSI and SI are organized in the form of tables. Typical examples of the PSI table are a program association table (PAT), a program map table (PMT), a network Information table (NIT) and a conditional access table (CAT). The PAT table contains a list of all programs and has a data structure defining the packet identifier of the PMT table. The PMT table defines packet identifiers of streams of audio, video, data and applications that constitute a broadcast program. The NIT table contains private information data on the transmission system. And, the CAT table contains private data for conditional access. These PSI tables have a maximum length of 1024 bytes. The SI table includes a bouquet association table (BAT), a service description table (SDT), an event information table (EIT) and an application information table (AIT). Of these, the AIT table provides all the information on the applications required by a bouquet of a particular channel. The AIT table includes an application descriptor loop. With the AIT table, the information on the applications required to provide the corresponding service is provided. The AIT table is transported repeatedly, with the minimum repeat rate of about 10 seconds. With regard to the AIT table, please refer to EP 989,743, which is incorporated herein in their entirety.

In accordance with a preferred embodiment of the present invention, an application provisioning descriptor is further included in the AIT table. Consequently, the AIT table includes the application descriptor loop and the application provisioning descriptor loop. The application provisioning descriptor loop may be present either within the application descriptor loop or independently of the application descriptor loop. The AIT table is transported in the form of ATTS (always tuned transport stream). The ATTS is independent of the A/V, (audio/video) data of the service the user is watching and is constructed as a multicast IP (internet protocol) group independently of the A/V (audio/video) data of the service. This type of provisioning signaling service is advantageous in that almost real-time monitoring can be attained by adopting a single ATTS concept. Further, executable files can be placed in a different route from the A/V service the user is watching, such as DSM-CC (digital storage media command and control) carousel of MPEG2 transport stream or HTTP (hypertext text transport protocol). This reduces the bandwidth to be monitored and the load of the network and increases the capability of the set-top box. In addition, a variety of transmission techniques can be applied for the provisioning of the application contents.

Preferably, the application provisioning descriptor for the transport of the provisioning information for NSP applications contains the following information:

(A) Application identifier (optional);

(B) Application version;

(C) Location information of the application to be provisioned; and (D) Stored priority information of the application to be provisioned (optional).

(A) Application Identifier Specified in the Application Provisioning Descriptor

The application identifier specified in the application provisioning descriptor identifies which applications are provisioned. The application information table contains the information on all applications required by a bouquet. Accordingly, two or more applications are typically included in a single AIT table. The application identifier specified in the application provisioning descriptor makes the application to be provisioned distinguishable from other applications specified in the AIT table. If the application provisioning descriptor is included within a particular application descriptor loop, the application to be provisioned can be identified from the application identifier specified in the application descriptor within which the application provisioning descriptor is included. In case the application provisioning descriptor is provided independent of the application descriptor loop, the application identifier is mandatory.

(B) Application Version Specified in the Application Provisioning Descriptor

The application version information specified in the application provisioning descriptor informs the version of the application to be provisioned. User terminal (set-top box) identifies the version of the application to be provisioned based on the application version specified in the application provisioning descriptor, and then compares it with the version of the application previously stored in the terminal. If the version information in the application provisioning descriptor is identical to the version information of the application previously stored in the set-top box, then downloaded status is checked. If the downloaded status indicates normal downloading, no further downloading is preformed. In this case, the provisioning information specified in the application provisioning descriptor is ignored and previously downloaded application is executed. To the contrary, if the version information specified in the application provisioning descriptor is different from the version information of the application stored in the set-top box, the downloading of the application is carried out. Or, if the downloading of the application to be provisioned is not correctly performed (in this case, the downloaded status indicates "updated & downloading"), the downloading of the application is also performed. And then, the downloaded status is updated as "downloaded".

(C) Location Information of the Application to be Provisioned, which is Specified in the Application Provisioning Descriptor The location information of the application to be provisioned, which is specified in the application provisioning descriptor, identifies where the application to be provisioned is carried. The provisioning of the application may be performed from various routes, for example DSM-CC (digital storage media command and control) carousel, an application over HTTP (hypertext transfer protocol) or a combination thereof. When the provisioning of the application is performed from the application over HTTP, additional multicasting of the application is not required.

Most preferably, the provisioning of the application is performed from a combination of DSM-CC carousel and the application over HTTP. Typically, most of user terminals complete the provisioning of NSP applications within a week. Accordingly, it is preferable that the provisioning of the NSP application is performed from DSM-CC carousel that allows concurrent accesses in a predetermined time (e.g., a week), and thereafter, from the application over HTTP that allows 1:1 interaction. Such a combination provides decrease of the bandwidth and accomplishes efficient provisioning.

(D) Stored Priority Information of the Application to be Provisioned, which is Specified in the Application Provisioning Descriptor The stored priority information of the application to be provisioned, which is specified in the application provisioning descriptor, indicates whether the application is to be stored into a non-volatile memory. For example, if the NSP application to be provisioned is to be stored into a non-volatile memory, "2" is assigned as the stored priority information. "1" is assigned if the application to be provisioned is recommended to be stored into a non-volatile memory is and "0" is assigned if it is not to be stored. For example, an EPG application (electronic program guide application) needs to be stored in the non-volatile memory of the user terminal. In the application provisioning descriptor for the provisioning of EPG application, "2" is assigned as the stored priority information.

Besides the information above mentioned, various information such as network identifier (ID), transport stream identifier (ID), service identifier (ID), and so forth may be further included within the application provisioning descriptor. More detailed description will be given in the following, referring to FIG. 2.

The Scenario of the provisioning of the applications at the user terminal (or set-top box) is as follows. First, the last version and the downloaded status of the application are recorded in the memory of the set-top box. For example, the downloaded status is set as "downloaded" if the downloading of the application to be provisioned has been performed normally, and "updated and downloading" is recorded as the downloaded status if the downloading has been initiated but is not performed normally, which may be resulted from abnormal downloading due to various causes, such as power failure of the set-top box, network overload, and so forth. When the set-top box is booted, the provisioning monitor application is started. If the provisioning monitor application is loaded successfully, tuning to ATTS occurs. Subsequently, the ATTS is monitored and the application provisioning descriptor of the AIT table transported in the form of ATTS is checked. If the application specified in the AIT table is not an application to be provisioned, previously stored application is loaded under the control of an application manager.

To the contrary, the middleware informs to a boot launcher and the boot launcher starts updating of the application status and/or downloading of the application, under the following circumstances:

1. The final downloaded status of the application indicates "updated & downloading", wherein downloading has been performed abnormally due to various causes; and 2. The version information of the application specified in the application provisioning descriptor is different from the version information of the application recorded in the set-top box.

In the circumstances, the application to be provisioned is downloaded based on the location information of the application to be provisioned, which is specified in the application provisioning descriptor. Then, the application is stored based on the stored priority information specified in the application provisioning descriptor. After the provisioning of the application has been normally completed, the provisioning monitor application re-monitors the AIT table transmitted in the form of ATTS.

FIG. 1 is a flowchart illustrating the method for provisioning NSP application in accordance with the present invention. It snows the procedure of the provisioning of the application at each of the user terminals. Firstly, the provisioning monitor application starts when the user terminal is booted (S100). If the provisioning monitor application is successfully loaded, tuning (or connection) to ATTS occurs (S200). Then, the AIT table that is signaled in the ATTS is monitored and the application provisioning descriptor within the AIT table is checked (S300). Thereafter, it is checked if the version information of the application stored in the set-top box is identical to the version information of the application to be provisioned specified in the application provisioning descriptor and the downloaded status is checked (S400). Specifically, if the previously downloaded version is the same with that of the application provisioning descriptor and the downloading has been performed normally, previously stored application is executed by the application manager without further downloading (S500). In contrast, if the versions are different each other, the last version is stored and the downloaded status is set as "downloading" (S600). Then, the location information of the application to be provisioned, which is specified in the application provisioning descriptor, is checked. Specifically, it is checked whether the application location is from NSP service (S700). If the application location is from the NSP service, tuning to the service occurs to find the AIT table in this service (S800). Then, the NSP application is downloaded as specified in the AIT table (S900). If the application to be provisioned is the application over HTTP, the NSP application is downloaded from F-HTTP (S1000). After completion of the download, it is checked if the application to be provisioned is to be stored into a nonvolatile memory (S1100). If so, the application is stored into a non-volatile memory (S1200). Subsequently, the previous stored application is killed, the downloaded status is set as "downloaded" and the new application is launched (S1300). Following this procedures, the step S200 of tuning to ATTS is re-initiated.

FIG. 2 exemplifies the application provisioning descriptor to be included in the AIT table used in the provisioning of NSP application in accordance with the present invention. The application provisioning descriptor 100 shown in FIG. 2 is generally specified within in the application descriptor loop of the AIT table. Accordingly, the application identifier of the application to be provisioned (application ID) may be omitted. In case the application provisioning descriptor is provided independently of a particular application descriptor loop, the application identifier is mandatory. Within the application provisioning descriptor 100, a descriptor tag 101, a descriptor length 102, an application version 103, an AIT URL service length 104, a network identifier 105, a transport stream identifier 106, a service identifier 107 and stored priority information 108 are included. The descriptor tag has a fixed value, OxF1. The application version is the version of the application to be provisioned. When it reaches to "31", it wraps around to "0." The AIT URL service length indicates the number of bytes in the URL (Uniform Resource Locator). When the application is carried via conventional MHP service only, this value shall be "0." The AIT_URL_byte form a URL (uniform resource locator) conforming to the IETF RFC 2396 standard. The network identifier is the identification information of the network where the application to be provisioned is carried. The transport stream identifier identifies the transport stream where the application to be provisioned is carried. The service identifier identifies is the service where the application is carried. For applications carried within AIT URL service over HTTP only, this value shall be "0" and the network identifier and the transport stream identifier are ignored. The stored priority information indicates whether the application to be provisioned is to be stored. In a specific embodiment of the present invention, the value has "2," the application is to be stored, "1" recommended to be stored, and "0" not to be stored into a non-volatile memory. Other values are reserved.

The method for provisioning of NSP application in accordance with the present invention provides the following advantages:

(a) Since the tuner used for ATTS can also process other transport streams, resources related to the transport stream other than the service that the user is currently watching can be used. In contrast, with the conventional method using OOB transport streams, the provisioning of the application is impossible without sacrificing the service the user is watching. Hence, the method for provisioning NSP application in accordance with the present invention provides improved flexibility compared with the conventional provisioning method.

(2) As for IPTV (internet protocol television), no further physical component is required because the tuner needs not be a physical tuner. Almost real-time monitoring can be attained by adopting a single ATTS concept. Further, the bandwidth can be reduced by downloading the executable files from a different route. This reduces the network load and improves the efficiency of set-top box performance. In addition, a variety of transmission techniques can be applied for the provisioning of the application contents.

As described, it should be evident that the present invention can be implemented through a variety of configurations in the aforementioned technical field without affecting, influencing or changing the spirit and scope of the present invention. Therefore, it is to be understood that the examples and applications illustrated herein are intended to be in the nature of description rather than of limitation. Furthermore, the meaning, scope and higher conceptual understandings of the present invention as well as modifications and variations that arise therefrom should be understood to be extensions to this invention.

The invention claimed is:

1. A method for provisioning a network service provider application (NSP application) in a digital interactive broadcasting environment, comprising the steps of:
    A) at a broadcasting headend server, incorporating an application provisioning descriptor including at least an application version information and a location information of the NSP application to be provisioned into an application information table (An table) and transmitting the AIT table through a digital broadcasting network in a form of an always tuned transport stream (ATTS); and
    B) at a user set-top box,
        b-1) checking the application version information specified in the application provisioning descriptor and a downloaded status of the application, and comparing the application version information with a version information of an application previously stored into the set-top box,
        b-2) if the application version specified in the application provisioning descriptor is the same with the version of the application previously stored in the set-top box and downloading of the application has been performed normally, executing the previously stored application without any downloading, and
        b-3) if the application version specified in the application provisioning descriptor is different from the version of the application previously stored in the set-top box or if downloading of the application has been performed abnormally, accessing and downloading the application based on the location information of the application to be provisioned, which is specified in the application provisioning descriptor
    wherein the ATTS is independent of A/V (audio/video) data of a service a user is watching, and
    wherein the application provisioning descriptor includes information on a descriptor tag, a descriptor length, an application version, an AIT URL service length, a network identifier, a transport stream identifier, a service identifier and a stored priority.

2. The method as set forth in claim 1, wherein the application provisioning descriptor is present within an application descriptor loop in the AIT table.

3. The method as set forth in claim 1, wherein the application to be provisioned is carried from any one selected from the group consisting of digital storage media command and control (DSM-CC) carousel, an application over hypertext text transport protocol (HTTP) and a combination thereof.

4. The method as set forth in claim 3, wherein the application to be provisioned is carried from the combination of the DSM-CC carousel and the application over HTTP.

5. The method as set for in claim 4, wherein the application to be provisioned is carried from the DSM-CC carousel at an early stage of provisioning, and thereafter from the application over HTTP.

6. The method as set forth in claim 1, wherein the application provisioning descriptor further includes stored priority information of the application to be provisioned that indicates whether the application to be provisioned is to be stored into a non-volatile memory, as well as the application version information and the location information.

7. The method as set forth in claim 1, wherein the application provisioning descriptor further includes an application identifier that identifies which application is provisioned.

8. The method as set forth in claim 1, wherein the step b-1) is carried out with activation of a provisioning monitor application for monitoring the AIT table.

9. A method for provisioning a network service provider application (NSP application) in a digital interactive broadcasting environment, comprising the steps of:
- A) at a broadcasting headend server, incorporating an application provisioning descriptor including at least an application version information and a location information of the application to be provisioned into an application information table (AIT table) and transmitting the AIT table through a digital broadcasting network in a form of always tuned transport stream (ATTS); and
- B) at a user set-top box,
  - i) starting a provisioning monitor application when the user set top box is booted,
  - ii) tuning to the ATTS and checking the AIT table in the ATTS and the application provisioning descriptor within the AIT table,
  - iii) checking the application version information specified in the application provisioning descriptor and a downloaded status of the application, and comparing the application version information with a version information of an application previously stored into the set-top box,
  - iv) if the application version specified in the application provisioning descriptor is the same with the version of the application previously stored in the set-top box and downloading of the application has been performed normally, executing the previously stored application without any downloading,
  - v) if the application version specified in the application provisioning descriptor is different from the version of the application previously stored in the set-top box or if downloading of the application has been performed abnormally, recording last version of the application in order to update the version information, setting the downloaded status as "downloading", and checking the location information of the application to be provisioned, which is specified in the application provisioning descriptor,
  - vi) downloading the application to be provisioned based on the location information from digital storage media command (DSM-CC) carousel or hypertext text transport protocol (HTTP), and
  - vii) killing the previously stored application and setting the downloaded status as "downloaded" if the downloading of the application has been completed normally, wherein the ATTS is independent of A/V (audio/video) data of a service a user is watching, and wherein the application provisioning descriptor includes information on a descriptor tag, a descriptor length, an application version, an AIT URL service length, a network identifier, a transport stream identifier, a service identifier and a stored priority.

\* \* \* \* \*